April 25, 1961 W. H. MONTGOMERY 2,981,032
WESTERN-STYLE TOY
Filed Sept. 12, 1958 3 Sheets-Sheet 1
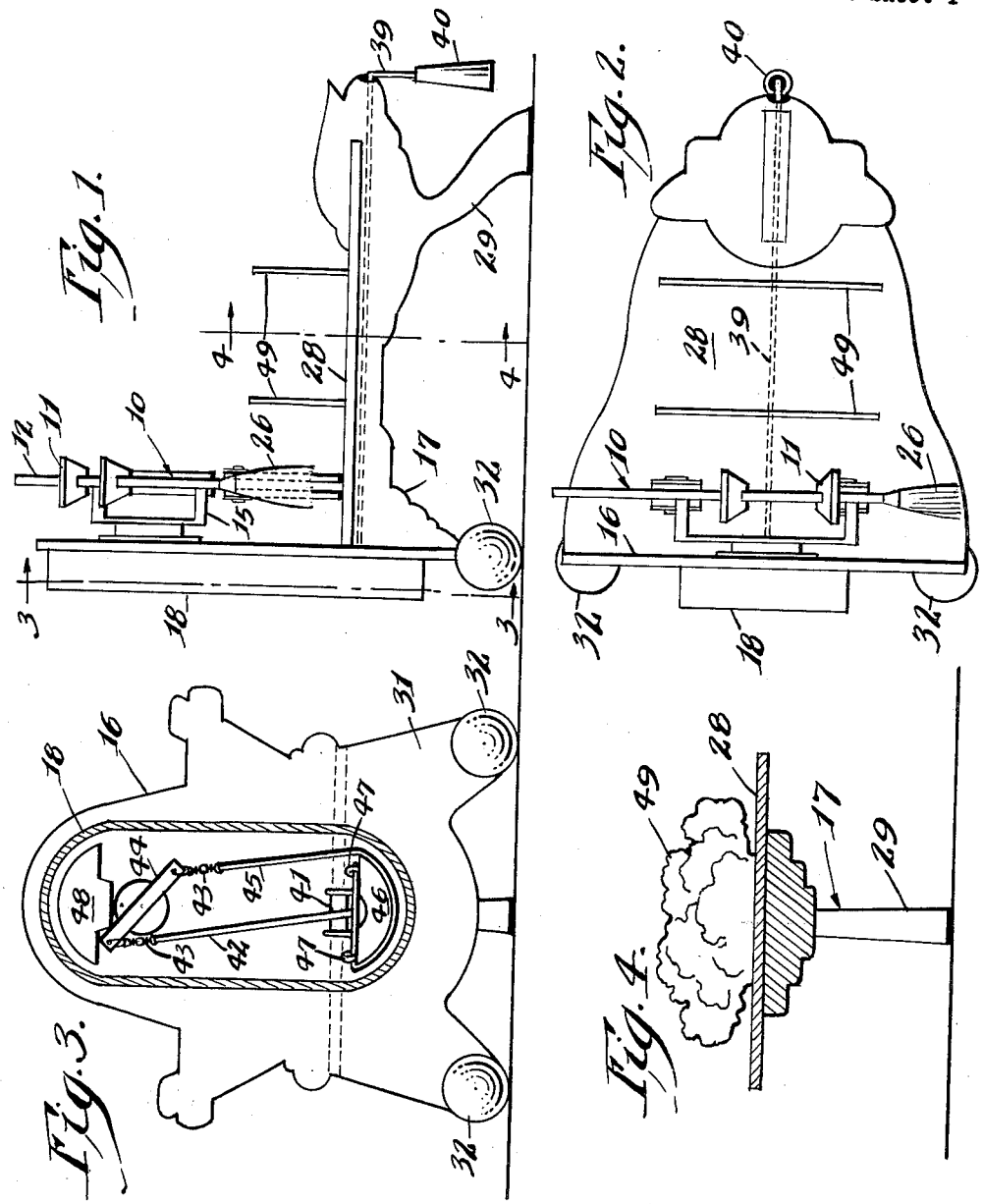
INVENTOR.
William H. Montgomery.
BY
Wilson T. Geppert
ATTORNEYS April 25, 1961 W. H. MONTGOMERY 2,981,032
WESTERN-STYLE TOY
Filed Sept. 12, 1958 3 Sheets-Sheet 2
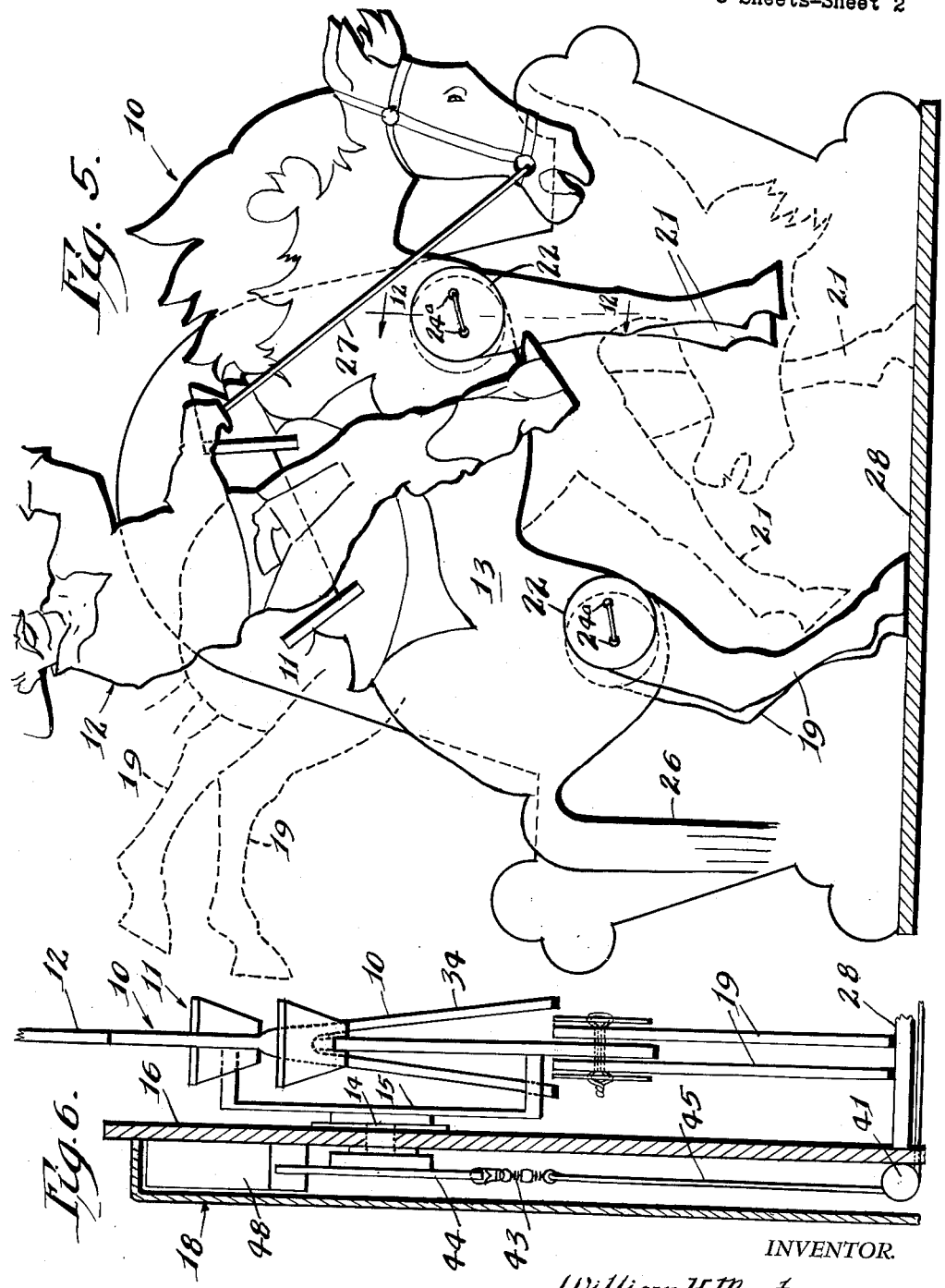
INVENTOR.
William H. Montgomery.
BY
Wilson & Geppert
ATTORNEYS April 25, 1961
W. H. MONTGOMERY
2,981,032
WESTERN-STYLE TOY
Filed Sept. 12, 1958
3 Sheets-Sheet 3
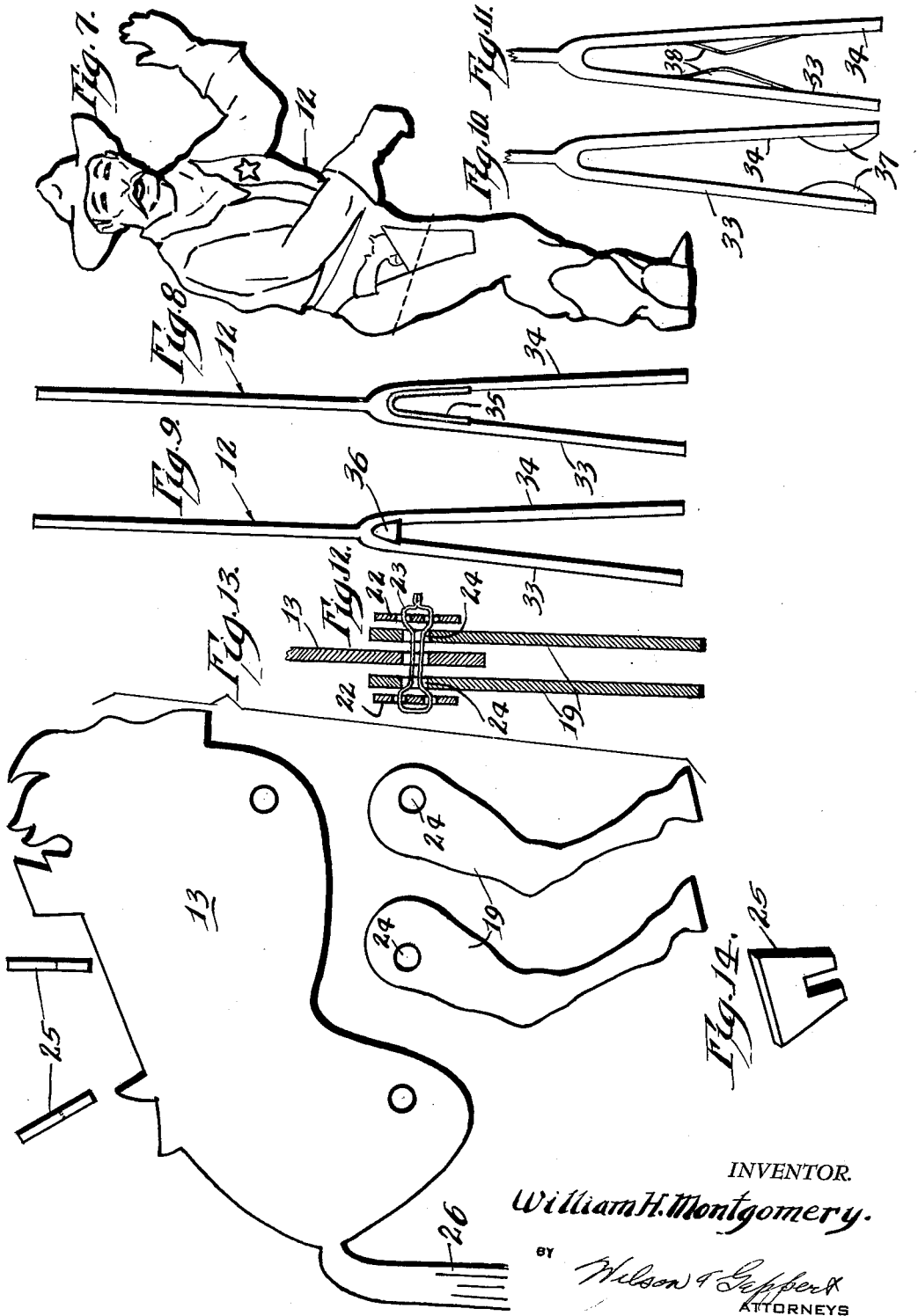
INVENTOR.
William H. Montgomery.
BY
Wilson & Geppert
ATTORNEYS

United States Patent Office 2,981,032
Patented Apr. 25, 1961

2,981,032
WESTERN-STYLE TOY

William H. Montgomery, Hotel Plaza, 59 W. North Ave., Chicago 10, Ill.

Filed Sept. 12, 1958, Ser. No. 760,765

5 Claims. (Cl. 46—127)

The present invention relates to a novel western-type toy including a bucking animal and western characters or riders adapted to be removably mounted in the saddle.

Among the objects of the present invention is to provide a novel bucking animal and a novel means and manner of actuating said animal to give it a bucking action.

A further important object is the provision of a novel toy having a bucking animal and a series of western riders or characters each of the latter provided with means for temporarily retaining any one of such characters upon the bucking animal but so constructed and arranged that the mounted rider can be dislodged and forcibly ejected from the saddle to the delight of the youngster or person operating the toy as well as those viewing its operation.

The present invention further comprehends a novel actuating mechanism for causing the animal to be moved or oscillated in a manner simulating the movements of a bucking bronco with the rider being finally dislodged and ejected from the saddle. During actuation of the toy the animal is given movements that closely resemble those of a bucking bronco or other animal seen in rodeos and the like, so that a child or other person operating and those viewing the performance are highly amused.

As the rider is separate from the animal and retained in the saddle only until dislodged and ejected by the bucking of the animal, he may be returned to the saddle or other substitute rider supplied with toy mounted in the saddle and the device again operated until that rider is dislodged and ejected. To add to the interest in the actuation of the toy, several children or adults may choose a rider and take turns in dislodging and ejecting the one chosen to determine how long he may remain in the saddle or how quickly he may be dislodged and ejected therefrom whereby an amusing game may be played.

The present novel toy with its bucking animal and riders each of which is adapted to be removably mounted in a saddle, and its mechanism for actuating said animal and dislodging and ejecting a rider from the saddle, closely simulates the movements of a bucking bronco which many purchasers or operators of the toy had previously seen and enjoyed at rodeos and other exhibitions in the movies, on television, etc. Due to its close approximation of what actually happens when a western character, whether he be a sheriff, cowboy, Indian or other rider, performs on a bucking animal and his performance judged by the time he actually remains on the animal, the present invention has a wide appeal not only with children but also with adults.

The invention further resides in the construction, combination and arrangement of parts illustrated in the accompanying drawings, and while there is shown therein a preferred embodiment, it is to be understood that the same is susceptible of modification and change, and comprehends other details, arrangements of parts, features and constructions without departing from the spirit of the invention.

In the drawings:

Figure 1 is a side elevational view on a reduced scale of a western toy embodying the present invention.

Fig. 2 is a top plan view of the novel toy.

Fig. 3 is a view in vertical cross section through the housing at the rear of the toy, the view being taken in a plane represented by the line 3—3 of Fig. 1 and viewed in the direction of the arrows.

Fig. 4 is another view in vertical cross section but taken in a plane represented by the line 4—4 of Fig. 1 and viewed in the direction of the arrows.

Fig. 5 is a fragmentary enlarged view in front elevation of the bucking animal and rider and showing in dotted lines the animal and parts thereof in a different operative position.

Fig. 6 is an enlarged fragmentary view, part in vertical cross section through the housing to show the actuating mechanism at the rear, and showing the animal and rider in end elevation and the manner in which the animal is oscillated to simulate bucking.

Fig. 7 is a view in side elevation of one of the western characters or riders, such as a sheriff, adapted to be positioned in the saddle.

Fig. 8 is a view in end elevation of one of the riders having means for retaining him in the saddle until dislodged and ejected therefrom upon continued bucking of the animal.

Fig. 9 is a view similar to Fig. 8 but in which a magnet is provided for retaining the rider in the saddle.

Fig. 10 is a fragmentary view in end elevation of a rider in which the legs are provided with weights for retaining him in the saddle on the bucking animal until dislodged.

Fig. 11 is a view similar to Fig. 10 but in which the legs are provided with tension means for retaining the rider in the saddle until forcibly dislodged by the bucking animal.

Fig. 12 is a fragmentary enlarged view in vertical cross section through the bucking animal, the view being taken on the line 12—12 of Fig. 5 and viewed in the direction of the arrows.

Fig. 13 is a disassembled view of the bucking animal.

Fig. 14 is a perspective view of one of the members forming the saddle.

Referring more particularly to the disclosure in the drawings and to the novel illustrative embodiment therein shown, the present toy comprises an animal, such as a horse or bucking bronco, 10 provided with a saddle 11 for receiving one of plural riders 12 each representing or simulating a western character, such as a sheriff, cowboy, Indian, etc.

The body 13 of the horse is mounted for pivotal movement upon a stub shaft 14 and a substantially U-shaped mounting 15, the stub shaft being journalled in an upright panel 16 on a supporting frame or base 17, the rear of this shaft projecting into and enclosed within a housing 18 at the rear of the panel 16.

To the body 13 of the horse are connected a pair of rear legs 19 and a pair of front legs 21 with each pair of legs mounted for freedom of pivotal movement relative to the body by means of a pair of external discs 22 and attaching means 23 which may be a strong cord strung through an opening 24 in each leg and spaced openings 24a in the discs and with the ends tied together. The openings 24 in each pair of legs 19 and 21 for receiving the attaching means 23 are offset as shown in Fig. 13 so that the legs do not move together as the animal is actuated as shown in dotted line in Fig. 5. Upon the body is mounted the saddle 11 having spaced end members 25 (Fig. 14) for receiving therebetween any one of the riders 12. The tail 26 of the animal is formed of multiple cords, such as a tassel, and the reins 27 of a cord or line, whereby the animal and its trappings bear a close resemblance to a bucking bronco when standing still or when in motion.

The supporting frame or base 17 is provided with a horizontally arranged deck 28 and the base provided with a supporting leg 29 at the front or reduced end of the deck, and at the rear provided with a depending portion 31 projecting from the upright panel 16 upon each of the opposite corners of which is mounted a spherical member 32 arranged in such relation with the leg 29 to provide a rigid, substantially triangular support for positioning the toy upon the floor, table or other supporting surface.

Each rider 12 is provided with legs 33 and 34 spaced apart to straddle the animal and permit the rider to seat conformably in the saddle 11. To retain the rider for a period of time but yet permit the bucking of the animal to dislodge and eject him from the saddle, I disclose four forms of retaining means. In the form of Fig. 8, there is provided an inverted, substantially V-shaped insert 35 between the legs to grip the sides of the animal within the ends of the saddle. In Fig. 9, the retaining means comprises a magnet 36 inserted between the legs providing a magnetic coupling with one or more pieces of metal applied to the saddle. In Fig. 10, weights 37 are provided on the legs of the rider and in Fig. 11 tension means or springs 38 are provided.

To actuate the bucking animal 10, there is provided a pull or cord 39 projecting through an opening in the base with the outer or forward end of the cord provided with a tassel or knob 40 to be grasped, and when pulled causing the animal to buck. This cord passes over a roller 41 with its inner end 42 attached to one end of a swivel 43 and the other end of this swivel attached to one end of an elongated bar 44 centrally affixed to the rear end of the stub shaft 14. The other end of the bar 44 is attached to an end of another swivel 43 with the other end of this swivel attached to an elastic band or cord 45. The elastic band 45 encompasses the annular surface or periphery of a semi-circular stationary block 46 affixed to the rear panel 16, and then projects over the flat or horizontal surface of this block where its other end is secured to an eyelet or hook 47. To maintain the elastic band about the block 46 other eyelets 47 are preferably provided through which this band passes as it is elongated and retracted.

Pulling outwardly or forwardly on the tassel or knob 40 pulls the cord 39 to rotate the bar 44 and the stub shaft 14 in one direction to cause the animal to buck. Upon releasing the tassel or knob 40, the elastic band 45 which has been extended automatically returns the bar 44 to its normal inoperative position as shown in Fig. 3 where the elevated end of the bar abuts the adjacent surface on a stationary block or stop 48. When the cord 39 is withdrawn to the limit of its outer movement to rotate the bar 44 in a counter-clockwise direction as viewed in Fig. 3, the opposite end of this bar engages the other side of this block 48 to limit its path of travel in that direction.

The housing 18 encloses the operating mechanism so that there is no danger of a child obtaining access thereto and being injured or disconnecting or damaging any of the component parts.

To add to the realism of the toy, the deck or platform 28 is also preferably provided with upstanding members 49 shaped and colored to simulate bushes.

The present toy is easily operated by a child and with the opening 24 in the legs offset, causing the animal to oscillate back and forth by pulling on and releasing the cord 39, results in each leg moving separately and giving realism to the animal's movements.

Each toy is provided with plural riders or characters, such as law enforcement officers, cowboys, Indians and other characters with which children are familiar. Each rider is provided with a means, such as disclosed in Figs. 8, 9, 10 and 11, tending to maintain the rider in the saddle until he is dislodged and ejected therefrom by the oscillation and bucking of the animal. This may be accomplished by tension means, by means of a magnet or by weights which lower the center of gravity of the rider.

Unlike prior devices, the animal is always under tension of the elastic band, spring or tensioning means 45 so that it is returned to a position in which the rear legs and rear of the animal are lowered and the head is elevated as shown in Fig. 5.

Having thus disclosed the invention, I claim:

1. A western-style toy comprising a supporting base, an animal body simulating a bucking bronco pivotally mounted adjacent the rear of the base and a saddle on the body of the animal, front and rear legs freely pivoted on the body of the animal, a removable rider adapted to be seated in the saddle of said animal, actuating means for oscillating said animal body about a fixed pivot to cause the animal body to follow a bucking motion with the legs free to swing in said motion, said actuating means comprising a rotatable stub shaft upon which the animal body is mounted, an oscillating bar affixed to the stub shaft, a cord affixed at one end to an end of the bar for rotating the latter in one direction and with its other end projecting to the front of the toy where it is grasped and pulled outwardly by the operator, an elastic band affixed at one end to the other end of said oscillating bar and its other end anchored whereby pulling of said cord elongates said elastic band and places it under tension for returning said oscillating bar and the bucking animal body to their original position upon the operator releasing the cord, and means tending to retain the rider upon said animal body during said bucking motion but permitting said rider to be dislodged and ejected upon repeated operation of said actuating means.

2. A western-style toy comprising a supporting base, an animal body simulating a bucking bronco pivotally mounted adjacent the rear of the base and a saddle on the body of said animal, front and rear legs freely pivoted upon the body of said animal, a removable rider adapted to be seated in the saddle of said animal, actuating means for oscillating said animal about a fixed pivot to cause the animal to follow a bucking motion with the legs free to swing in said motion, said actuating means including a cord which when pulled rotates the animal body in one direction and means placed under tension when the cord is pulled for returning the animal body to its original position upon release of the cord, whereby repeatedly pulling on and releasing said cord causes the animal body to oscillate back and forth and to simulate the movements of a bucking animal, and means tending to retain the rider upon said animal body during said bucking motion but permitting said rider to be dislodged and ejected upon repeated operation of said actuating means.

3. A western-style toy as set forth in claim 2, in which a rider is provided with spaced legs adapted to straddle the body of the animal and with tension means for maintaining said rider upon the animal body until he is forcibly ejected therefrom by the bucking of said animal.

4. A western-style toy as set forth in claim 2, in which a rider is provided with spaced legs adapted to straddle the body of the animal and with magnetic means for maintaining the rider upon said animal body until dislodged and ejected by the oscillation and bucking of said animal body.

5. A western-style toy as set forth in claim 2, in which a rider is provided with spaced legs adapted to straddle the body of the animal and with weights affixed to the legs of said rider for maintaining the rider upon said animal body until dislodged and ejected by the oscillation and bucking of said animal body.

References Cited in the file of this patent

UNITED STATES PATENTS

| 1,129,801 | Hendren | Feb. 23, 1915 |
| 2,674,457 | Rago | Apr. 6, 1954 |
| 2,783,585 | Kahl | Mar. 5, 1957 |
| 2,843,380 | Simon et al. | July 15, 1958 |

FOREIGN PATENTS

| 450,335 | France | Jan. 16, 1913 |